(12) United States Patent
Morein

(10) Patent No.: US 6,670,955 B1
(45) Date of Patent: Dec. 30, 2003

(54) METHOD AND SYSTEM FOR SORT INDEPENDENT ALPHA BLENDING OF GRAPHIC FRAGMENTS

(75) Inventor: Stephen L. Morein, Cambridge, MA (US)

(73) Assignee: ATI International SRL, Barbados (KN)

( * ) Notice: Subject to any disclaimer, the term of this patent is extended or adjusted under 35 U.S.C. 154(b) by 253 days.

(21) Appl. No.: 09/619,203

(22) Filed: Jul. 19, 2000

(51) Int. Cl.$^7$ .............................................. G06T 15/40
(52) U.S. Cl. ....................... 345/421; 345/422; 345/441; 345/589; 345/506; 345/614
(58) Field of Search .................................. 345/421, 422, 345/582, 589, 592, 614, 766, 768, 441, 506, 611

(56) References Cited

U.S. PATENT DOCUMENTS

| | | | | |
|---|---|---|---|---|
| 5,872,902 A | * | 2/1999 | Kuchkuda et al. | 345/615 |
| 5,923,333 A | * | 7/1999 | Stroyan | 345/422 |
| 5,977,977 A | * | 11/1999 | Kajiya et al. | 345/418 |
| 6,268,875 B1 | * | 7/2001 | Duluk et al. | 345/422 |

\* cited by examiner

Primary Examiner—Mark Zimmerman
Assistant Examiner—Kimbinh T. Nguyen
(74) Attorney, Agent, or Firm—Vedder, Price, Kaufman & Kammholz, P.C.

(57) ABSTRACT

The method provides for sort independent alpha blending of fragments of a graphic image. A sequence of fragments has opaque fragments and transparent fragments. The opaque fragments are rendered to a frame buffer having at least a z buffer, the z buffer having stored therein z values of front most opaque fragments. Transparent fragments are stored in a list in a transparent fragment buffer. The transparent fragments are sequentially read from the list and are discarded if they are occluded by an opaque fragment. When not occluded, the transparent fragments are stored in a list. The z buffer is cleared and the transparent fragments are read sequentially from the list. Z values are stored in the z buffer for back most transparent fragments. The transparent fragments are again sequentially read from the list. Z values of currently read transparent fragments are compared to z values in the z buffer of corresponding fragments. If a currently read transparent fragment is a back most transparent fragment, then it is rendered with alpha blending to the frame buffer, otherwise it is again stored in the list. This process is repeated beginning with the clearing of the z buffer until the list is empty.

14 Claims, 3 Drawing Sheets

METHOD AND SYSTEM FOR SORT INDEPENDENT ALPHA BLENDING OF GRAPHIC FRAGMENTS

FIELD OF THE INVENTION

The invention relates generally to graphics processing in a computer system, and more particularly to a method for blending graphic fragments.

BACKGROUND OF THE INVENTION

Transparency effects are a desirable and necessary part of rendering in graphic systems. The difficulty is that correctly handling transparency requires processing the polygons that contribute to the color of a pixel in a front to back or back to front order to determine the color. The transparency of an object is usually specified as an "alpha" value which indicates how much of the color is from this polygon and how much should be transmitted from a polygon behind this one.

When an object is rendered on the screen, an RGB color and a Z-buffer depth are associated with each pixel. Another component, called alpha, can also be stored. Alpha is a value describing the degree of opacity of an object for a given pixel. An alpha of 1.0 means the object is opaque and entirely covers the pixel's area of interest, 0.0 means the pixel is not obscured at all.

One well known approach to drawing objects with transparency is to sort the objects and draw them in a back to front order. This method can not correctly handle cases where polygons inter-penetrate. In each pixel in the screen that an polygon covers the current color in the pixel is multiplied by (1-the alpha of the polygon), the color of the polygon is multiplied by the polygon alpha, and the two results are summed and placed into the pixel as the new current color. In many applications the cost to sort the polygons is unacceptable, frequently due to the large number, but increasingly due to the inclusion of geometric transformation hardware into the graphics pipeline which makes the correct ordering unknown until the primitives are transformed. While it might be possible to move the sorting into the graphics hardware, this is generally impractical as a buffer large enough to hold the polygons would need to be provided.

In addition most 3D graphics systems provide a mechanism for determining which object elements are visible at each pixel. The most common is "z buffering" which involves storing a depth (Z) value at each pixel. Initially this value is set to the most distant value. When an polygon is drawn into the pixel, the depth value is calculated for the intersection of the polygon and the pixel. If the calculated depth value is behind the depth value stored in the pixel, the polygon is not visible in the pixel and its contribution is discarded. If instead the image element depth value is in front of the depth value of the pixel then the image elements color and z can replace the color and z in the pixel. If the objects are opaque the image elements can be rendered in any order. If they are not then the transparent image elements must be rendered last and sorted back to front. An transparent fragment would be correctly occluded if the depth value in the fragment is in front of the depth value of the transparent image element. If the transparent image element were in front it would be alpha blended with the existing color value at the pixel. A third polygon then drawn to that pixel that has depth in-between the previously drawn opaque polygon and the more recent transparent polygon could not be drawn correctly. It will fail the z test, the z having been updated when the first transparent polygon was drawn and the correct color can not be determined without knowing the two colors before they were blended into the pixels color.

One simple method for approximating transparency is called screen-door transparency. The idea is to render the transparent polygon with a checkerboard fill pattern. That is, every other pixel of the polygon is rendered, thereby leaving the object behind it partially visible. Usually the pixels on the screen are close enough together that the checkerboard pattern itself is not visible. The problem with this technique is two fold. First, a transparent object can be only 50% transparent with a simple checkerboard. Larger patterns than a checkerboard are used, but in practice such patterns are usually visible. Second, only one transparent object can be convincingly rendered on one area of the screen. For example, if a transparent red object and transparent green object are rendered atop a blue object, only two of the three colors can appear on the checkerboard pattern. A more complex pattern might allow for the occasional correct rendering of transparency, but since there is no knowledge of what patterns were previously used it is possible that a pattern would be chosen that would exactly cover a previously used pattern for the pixel resulting in an incorrect color. However, one advantage of this technique is its simplicity. Transparent objects can be rendered at any time, in any order, and no special hardware (beyond fill pattern support) is needed.

This approach has been further improved in prior art systems that support anti-aliasing through supersampling. In this case several colors represent each pixel, each color sample representing a slightly different position within the pixel. The primary purpose of this approach is to handle cases where only part of a polygon intersects a pixel. In such a case only some of the samples in a pixel are covered by the polygon. The final color of the pixel is only determined when all primitives have been rendered, at which point the samples are filtered into one single representative color. The screen door approach can be applied on a per sample instead of a per pixel basis. This will completely hide the pattern in the case where the pattern is smaller than the number of samples in each pixel. The other drawback of the screen door approach—incorrect color in the case of overlapping transparency remains.

What is necessary for more general and flexible transparency effects is the ability to keep track of more than one color/z value per pixel.

A prior art algorithm that is used to increase the sampling rate per pixel is Carpenter's A-buffer and is commonly used in software for generating high-quality renderings, but at non-interactive speeds. The A-Buffer approach also includes a improved approach for anti-aliasing but that can be ignored when looking at how it implements transparency that is independent of the order than polygons are rendered.

The core of the A buffer approach is maintaining a list in each pixel of all of the "fragments" that contribute to it. A fragment is the portion of a polygon that intersects the pixel. The process of drawing an polygon includes generating the fragments for each pixel that the polygon intersect. Generating a fragment usually includes calculation the color, depth (Z) and alpha value of the polygon at the pixel.

Each fragment is added to the list at its pixel if it might contribute to the final color. One option is to assume that all fragments will contribute. The list may be maintained in a depth sorted order. When all of the polygons have been drawn, each pixel is processed. The fragments in the list of the pixel are sorted if they were not maintained sorted. The fragments are then processed in order, which allows the correct color to be determined.

The prior art system used a linked list structure for the per pixel fragment list. The complexity of implementing a linked list or alternative structures have generally restricted the A buffer scheme to non-interactive software implementations of rendering systems.

Thus there is a need for a method of alpha blending fragments that operates efficiently without using linked lists or similar structures.

BRIEF DESCRIPTION OF THE DRAWINGS

The features of the present invention which are believed to be novel, are set forth with particularity in the appended claims. The invention, together with further objects and advantages, may best be understood by reference to the following description taken in connection with the accompanying drawings, in the several figures of which like reference numerals identify like elements.

DETAILED DESCRIPTION OF A PREFERRED EMBODIMENT OF THE INVENTION

The present invention is a method and system for sort independent alpha blending. A sequence of fragments of a graphic image to be displayed has opaque fragments and transparent fragments. The opaque fragments are rendered to a frame buffer having at least a z buffer, the rendering including storing z values in the z buffer that correspond to the front most opaque fragments. Transparent fragments are stored in a list in a transparent fragment buffer. The transparent fragments are then sequentially read from the list. A currently read transparent fragment is discarded if the currently read transparent fragment is occluded by an opaque pixel in the frame buffer. A currently read transparent fragment is stored in the list if the currently read transparent fragment is not occluded by an opaque corresponding pixel in the frame buffer. The z buffer in the frame buffer is then cleared. The transparent fragments are then sequentially read from the list and z values are stored in the z buffer for back most transparent fragments. The transparent fragments are again sequentially read from the list. A z value of a currently read transparent fragment is compared to a corresponding z value in the z buffer of a corresponding fragment. The currently read transparent fragment is rendered with alpha blending to a frame buffer if the currently read transparent fragment is a back most transparent fragment. If the currently read transparent fragment is not a back most transparent fragment, the currently read transparent fragment is stored in the list. The list is checked to determine if the list is empty. The method repeats the steps of clearing of the z buffer to the checking of the list, if the list is not empty. If the list is empty, the process is ended.

The sequence of fragments that are supplied can be a random sequence of opaque and transparent fragments. The color buffer and the frame buffer is initially updated with only color values of the opaque fragments, and thereafter it is updated with successive groups of back most transparent fragments.

In processing graphical images, it is well known in the art to divide the image into triangles. Position, color, normal and texture coordinate commands describe the vertices of the triangle and object coordinates. The processing step of rasterization includes converting the polygons, usually triangles, into fragments. This is done to determine which pixels in the frame buffer the polygon intersects and generating a fragment for each intersection. Color, depth and texture coordinates are assigned to each fragment, calculated from information specified with the triangle. The resulting fragments have a pixel coordinate, a value a color, a depth value and an alpha value.

Figure 1:
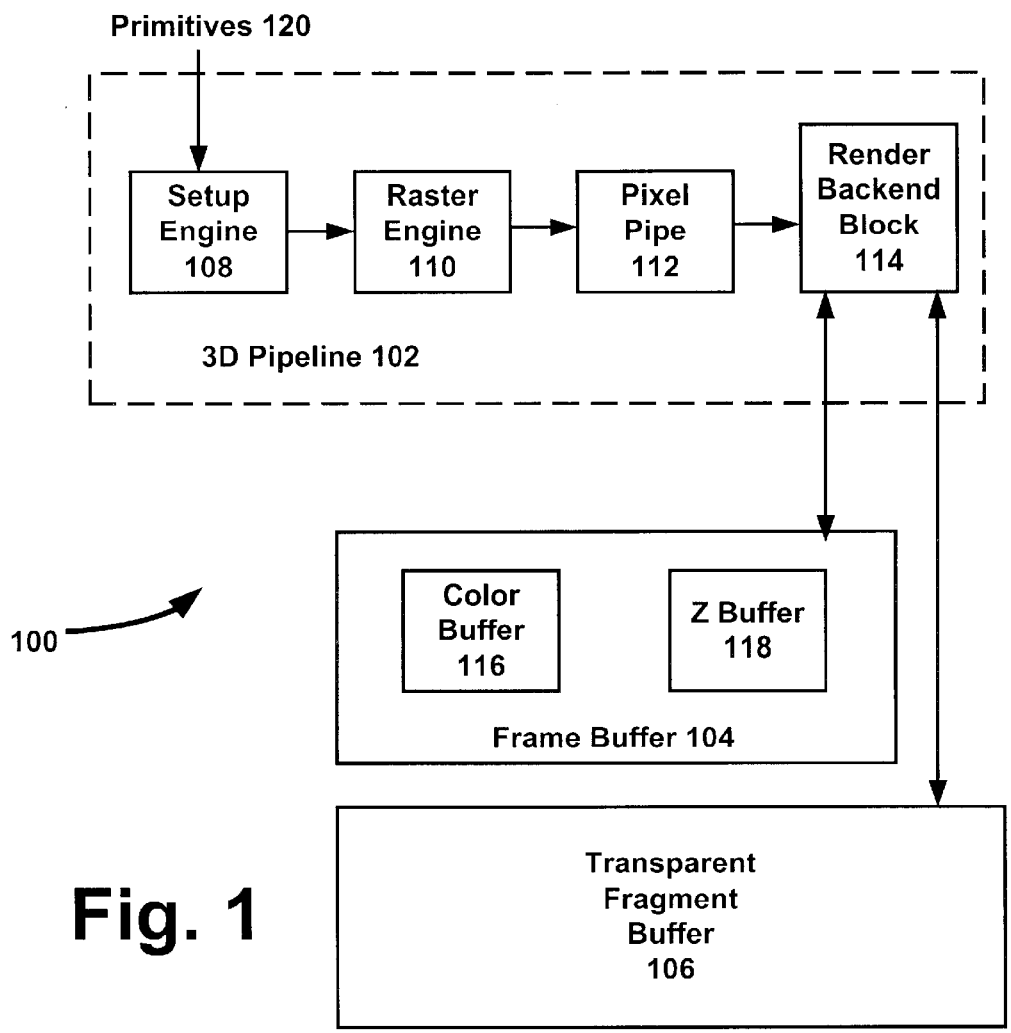
FIG. 1 depicts a pipeline for processing pixels in a graphic image in accordance with one embodiment of the invention.

FIG. 1 illustrates a circuit 100 that includes a 3D pipeline 102 operatively coupled to a frame buffer 104 and a transparent fragment buffer 106. The 3D pipeline 102 preferably includes a set up engine 108, a raster engine 110, a pixel pipe 112 (forming a first portion), and a render backend block 114, (forming a second portion). The frame buffer 104 has at least a color buffer 116 and a z buffer 118. The color buffer 116 stores color information corresponding to pixels in a display frame, and the z buffer 118 stores corresponding z values for the pixels included in the display frame.

The 3D pipeline 100 is included in a videographics integrated circuit that may also include two dimensional graphics processing and other processing blocks that may affect the data stored within the frame buffer 104. Such an integrated circuit is preferably capable of rendering three dimensional videographics images for display.

The set up engine 108 produces information based on graphic primitives 120 that are received by the 3D pipeline 102. The graphic primitives 120 are triangle primitives, which are commonly used in videographics applications. Slope information corresponding to these primitives is provided to the raster engine 110, which is operatively connected to the set up engine 108. The raster engine 110 generates pixel fragments from the primitive slope information. Preferably, each pixel fragment includes a color value, a set of coordinates indicating a pixel in a display frame to which the fragment corresponds, an alpha value indicating the degree of transparency, and a z value indicating depth.

The raster engine 110 provides the pixel fragments to the pixel pipe 112, which is operatively connected to the raster engine 110. The pixel pipe 112 performs various operations that may modify the color of the pixel fragment as received from the raster engine 110. Such operations can include texture mapping operations. The fragments resulting from the operations performed by the pixel pipe 112 are then passed to the render backend block 114 which is operatively connected to the frame buffer 104. The render backend block 114 in general blends fragments with corresponding pixels in the frame buffer 104 as determined by the set of coordinates for each fragment. The z value for each fragment is compared with a corresponding currently stored pixel z-value and the result is used to blend fragments with corresponding pixels. After all resulting pixel information is stored in the frame buffer 104, the frame buffer 104 can be accessed by display hardware to retrieve pixel information for use in generating a display stream for displaying an image on a display.

Figure 2:
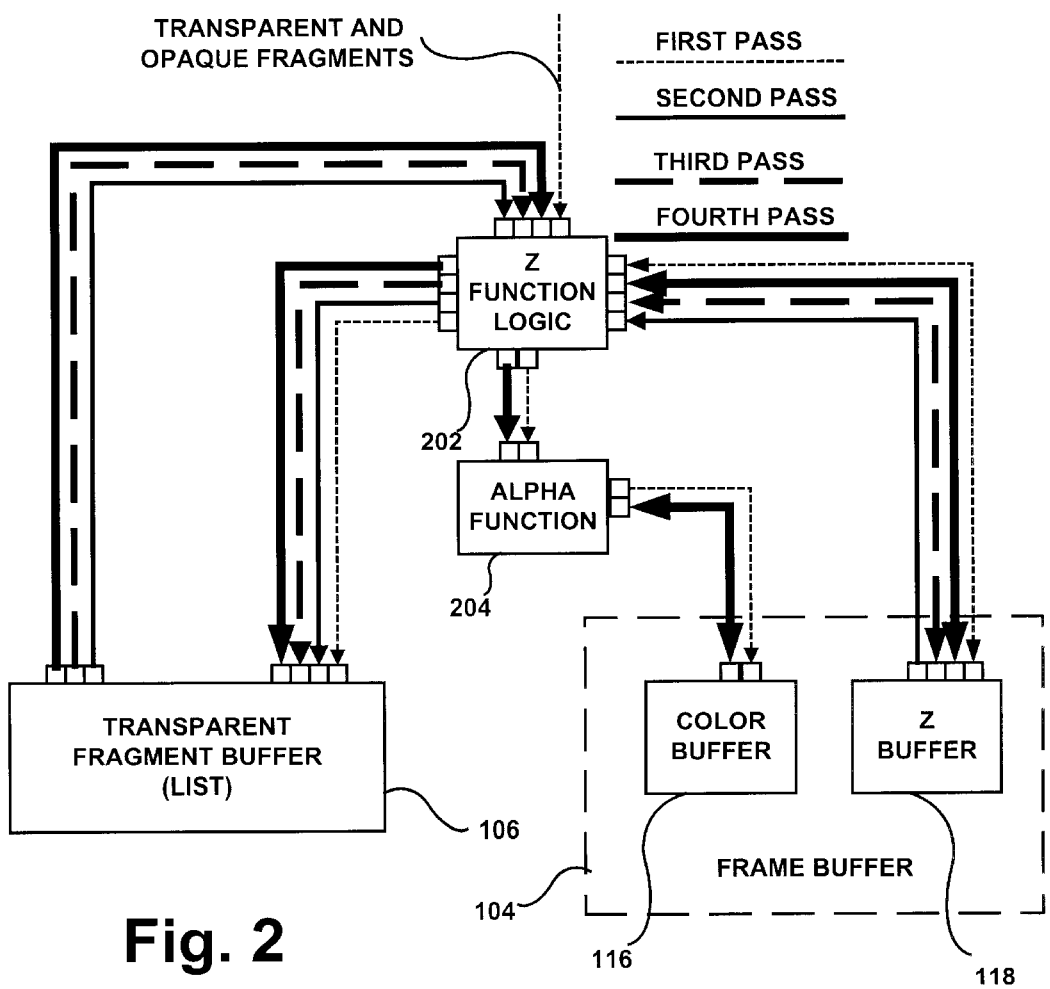
FIG. 2 is a diagram illustrating the operation of a method of the present invention.
Figure 3:
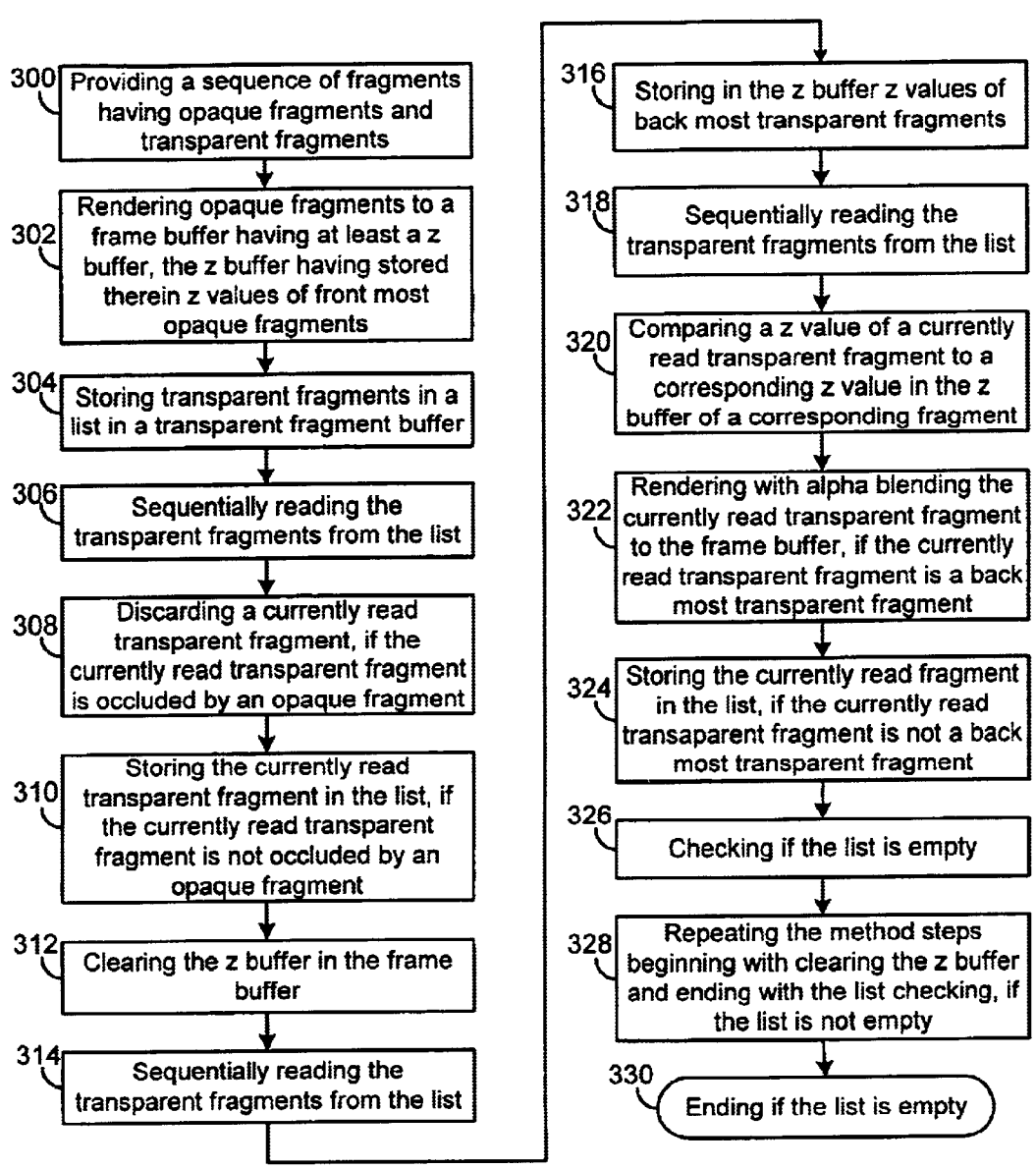
FIG. 3 is a flow chart depicting the steps of the method of the present invention.

FIG. 2 depicts in a functional form operation of the method of the present invention. FIG. 3 is a flow chart depicting the method of the present invention. The method of the present invention for sort independent alpha blending for producing a graphic image in the frame buffer will be described in reference to FIGS. 2 and 3.

The fragments that are supplied from the pixel pipe 112 may be opaque or transparent, and are supplied in a random order. In order to properly construct the image, it is necessary that the fragments be alpha blended in a proper order with regards to the transparent and opaque fragments and with regards to their z values, that is, the depth of the fragments relative to one another.

It is important to note that the method and operation of the present invention is independent of the sorting of the primitives for rendering the graphic image with alpha blending. The rendered backend block 114 receives fragments 200, which consist of opaque fragments and transparent fragments in a random sequence. This is depicted in FIG. 2 and as a first step 300 in FIG. 3. In FIG. 2 the render backend block 114 is illustrated as having a z function logic block 202 and an alpha blending block 204. Based on the alpha values of the fragments 200, opaque fragments are rendered to the frame buffer 104. In the frame buffer 104 the z buffer stores therein z values of front most opaque fragment in each pixel. The color buffer 116 stores the color values for the frontmost opaque fragment in each pixel. Transparent fragments are stored in a list in a transparent fragment buffer 106. See steps 302 and 304 in FIG. 3. This constitutes a first pass through the system depicted in FIG. 2.

In a second pass, the render backend block 114 sequentially reads the transparent fragments from the list in the transparent fragment buffer 106. If the currently read transparent fragment is occluded by an opaque fragment in the frame buffer 104, the currently read transparent fragment is discarded. The render backend block 114 reads the z values from the z buffer 118 in the frame buffer 104. If the currently read transparent fragment is not occluded by an opaque fragment (based on respective z values) in the frame buffer, the currently read fragment is stored again in the list in the transparent fragment buffer 106. This constitutes the second pass through the system depicted in FIG. 2 and is set forth in steps 306, 308 and 310 of FIG. 3. Note that in the second pass, no alpha blending occurs and the color buffer is not updated.

In a third pass, the z buffer 118 in the frame buffer 104 is cleared and the transparent fragments are read from the list sequentially by the render backend block 114. The z values of back most transparent fragments are stored in the z buffer 118 of the frame buffer 104 (currently read z values are compared with corresponding initial z values in the z buffer). The color buffer is not updated.

In a fourth pass, the transparent fragments are again read from the list in the transparent fragment buffer 106, and z values of the currently read transparent fragments are compared to corresponding z values in the z buffer 118 of the frame buffer 104. If a currently read transparent fragment is a back most transparent fragment, the currently read transparent fragment is rendered with alpha blending (block 204) to the frame buffer 104, thereby updating the color buffer 116. If the currently read transparent fragment is not a back most transparent fragment, then it is stored again in the list in the transparent fragment buffer. The list is then checked to determine if it is empty. If the list is not empty, then steps beginning with the clearing of the z buffer and ending with the checking of the list is repeated. This procedure is then followed until the list is empty at which point the frame buffer has been prepared for display.

It is important to note that the sequence of fragments can be a random unsorted sequence of opaque and transparent fragments. The color buffer 116 in the frame buffer 104 is initially updated with only color values of the opaque fragments, and thereafter updated with successive groups of back most transparent fragments. Thus, the present invention effects sort independent alpha blending for generating the image in the frame buffer, such that the fragments are in proper order. The present invention provides a simplified, faster and more efficient approach to processing of graphic images as compared to known prior art methods.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A graphics processing system for sort independent alpha blending of fragments, comprising:
   a pipeline having a first portion that receives primitives, and outputs an unsorted plurality of opaque and transparent fragments;
   the pipeline having a second portion operatively connected to the first portion, the second portion receiving the opaque and transparent fragments;
   a frame buffer operatively connected to the second portion of the pipeline, the frame buffer storing image frame data; and
   a transparent fragment buffer for temporarily storing the transparent fragments during formation of the image data in the frame buffer, the transparent fragment buffer being operatively connected to the second portion of the pipeline.

2. The graphics processing system according to claim 1, wherein the second portion of the pipeline has a z logic function stage operatively connected to an alpha blending stage, each of the z logic function block and the alpha blending stage being operatively connected to the transparent fragment buffer and the frame buffer.

3. A method of sort independent alpha blending of fragments, comprising the steps of:
   providing a sequence of fragments having opaque fragments and transparent fragments;
   rendering opaque fragments to a frame buffer having at least a z buffer, the z buffer having stored therein z values of front most opaque fragments;
   storing transparent fragments in a list in a transparent fragment buffer;
   sequentially reading the transparent fragments from the list;
   discarding a currently read transparent fragment, if the currently read transparent fragment is occluded by an opaque fragment;
   clearing the z buffer in the frame buffer;
   sequentially reading the transparent fragments from the list;
   storing in the z buffer z values of back most transparent fragments;
   sequentially reading the transparent fragments from the list;
   comparing a z value of a currently read transparent fragment to a corresponding z value in the z buffer of a corresponding fragment;
   rendering with alpha blending the currently read transparent fragment to the frame buffer, if the currently read transparent fragment is a back most transparent fragment;
   storing the currently read transparent fragment in the list, if the currently read transparent fragment is not a back most transparent fragment;
   checking if the list is empty;
   repeating the method steps beginning with clearing the z buffer and ending with the checking of the list, if the list is not empty; and
   ending, if the list is empty.

4. The method according to claim 3, wherein the sequence of fragments is a random unsorted sequence of opaque and transparent fragments.

5. The method claim according to claim 3, wherein the frame buffer has a color buffer, which is initially updated with only color values of the opaque fragments, and thereafter updated with successive groups of back most transparent fragments.

6. The method claim according to claim 3, wherein the step of rendering opaque fragments comprises comparing a z value of current fragment to a corresponding stored z value in the z buffer and replacing the stored z value in the z buffer with the z value of the current fragment when the current z value is representative of an opaque fragment.

7. A method of sort independent alpha blending of fragments, comprising the steps of:
   providing a sequence of fragments;
   in a first pass;
   identifying each fragment as one of an opaque fragment and transparent fragment;
   rendering opaque fragments to a frame buffer having at least a z buffer, the z buffer having stored therein z values of front most opaque fragments; and
   storing transparent fragments in a list in a transparent fragment buffer;
   in a second pass;
   sequentially reading the transparent fragments from the list;
   comparing a z value of a currently read transparent fragment to a corresponding z value in the z buffer of a corresponding opaque fragment;
   discarding the currently read fragment, if a result of the comparison indicates that the read transparent fragment is occluded by the corresponding opaque fragment;
   storing the currently read transparent fragment in the list, if a result of the comparison indicates that the read transparent fragment is not occluded by the corresponding opaque fragment;
   in a third pass;
   clearing the z buffer in the frame buffer;
   sequentially reading the transparent fragments from the list;
   storing in the z buffer z values of back most transparent fragments;
   in a fourth pass;
   sequentially reading the transparent fragments from the list;
   comparing a z value of a currently read transparent fragment to a corresponding z value in the z buffer of a corresponding fragment;
   rendering with alpha blending the currently read transparent fragment to the frame buffer, if a result of the comparison is an equality;
   storing the currently read fragment in the list, if a result of the comparison is not an equality;
   checking if the list is empty, repeating passes three and four if the list is not empty; and ending if the list is empty.

8. The method according to claim 7, wherein the sequence of fragments is a random sequence of opaque and transparent fragments.

9. The method according to claim 8, wherein the frame buffer has a color buffer, which is initially updated with color values of the opaque fragments, and thereafter updated with successive groups of back most transparent fragments.

10. The method claim according to claim 7, wherein the step of rendering opaque fragments comprises comparing a z value of current fragment to a corresponding stored z value in the z buffer and replacing the stored z value in the z buffer with the z value of the current fragment when the current z value is representative of an opaque fragment.

11. A method of sort independent alpha blending of fragments, comprising the steps of:
   providing a sequence of fragments;
   in a first pass;
   dividing the fragments into opaque fragments and transparent fragments;
   rendering opaque fragments to a frame buffer having a color buffer and a z buffer, z values of front most opaque fragments being stored in the z buffer and color values of front most opaque fragments being stored in the color buffer;
   storing the transparent fragments in a list in a transparent fragment buffer;
   sin a second pass;
   sequentially reading the transparent fragments from the list;
   comparing a z value of a currently read transparent fragment to a corresponding z value in the z buffer of a corresponding opaque fragment;

discarding the currently read transparent fragment, if a result of the comparison indicates that the read transparent fragment is occluded by the corresponding opaque fragment;

storing the currently read transparent fragment in the list, if a result of the comparison indicates that the read transparent fragment is not occluded by the corresponding opaque fragment;

in a third pass;

clearing the z buffer in the frame buffer;

sequentially reading the transparent fragments from the list;

storing in the z buffer z values of back most transparent fragments;

in a fourth pass;

sequentially reading the transparent fragments from the list;

comparing a z value of a currently read transparent fragment to a corresponding z value in the z buffer of a corresponding fragment;

rendering with alpha blending the currently read transparent fragment to thereby update a corresponding color value in the color buffer of the frame buffer, if a result of the comparison in an equality;

storing the currently read fragment in the list, if a result of the comparison is not an equality;

checking if the list is empty, repeating passes three and four if the list is not empty, and ending if the list is empty.

12. The method according to claim 11, wherein the sequence of fragments is a random sequence of opaque and transparent fragments.

13. The method according to claim 11, wherein the color buffer in the frame buffer is initially updated with only color values of the opaque fragments, and thereafter updated with successive groups of back most transparent fragments.

14. The method claim according to claim 11, wherein the step of rendering opaque fragments comprises comparing a z value of current fragment to a corresponding stored z value in the z buffer and replacing the stored z value in the z buffer with the z value of the current fragment when the current z value is representative of an opaque fragment.

* * * * *